(12) United States Patent
Carter

(10) Patent No.: US 8,191,838 B2
(45) Date of Patent: Jun. 5, 2012

(54) COLLAPSIBLE AND ADJUSTABLE ELECTRONICS SUPPORT SYSTEMS

(75) Inventor: Keith Carter, Maricopa, AZ (US)

(73) Assignee: Domestic Investments Group, LLC, Phoenix, AZ (US)

( * ) Notice: Subject to any disclaimer, the term of this patent is extended or adjusted under 35 U.S.C. 154(b) by 271 days.

(21) Appl. No.: 12/629,825

(22) Filed: Dec. 2, 2009

(65) Prior Publication Data

US 2011/0127392 A1    Jun. 2, 2011

(51) Int. Cl.
*F16M 11/38* (2006.01)
(52) U.S. Cl. .................. 248/188.6; 248/150; 248/176.1; 248/917; 248/923; 16/367
(58) Field of Classification Search ............... 248/188.6, 248/150, 149, 371, 397, 462, 176.1, 176.3, 248/284.1, 917, 921, 923, 922; 16/367
See application file for complete search history.

(56) References Cited

U.S. PATENT DOCUMENTS

| | | | |
|---|---|---|---|
| 4,735,388 A | 4/1988 | Marks | |
| 5,071,049 A * | 12/1991 | Mozer | 224/277 |
| 5,392,350 A * | 2/1995 | Swanson | 379/446 |
| 5,751,548 A * | 5/1998 | Hall et al. | 361/679.41 |
| 6,158,793 A | 12/2000 | Castro | |
| 6,464,185 B1 | 10/2002 | Minelli | |
| 7,296,771 B2 * | 11/2007 | Kalis et al. | 248/288.31 |
| 7,380,759 B1 * | 6/2008 | Whiteside et al. | 248/183.1 |
| 7,423,892 B2 * | 9/2008 | Vinciarelli | 363/65 |
| 7,487,940 B2 * | 2/2009 | Saez et al. | 248/176.1 |
| 8,020,816 B2 * | 9/2011 | Laitila et al. | 248/125.7 |
| 2005/0258323 A1 * | 11/2005 | Lin | 248/278.1 |
| 2009/0308993 A1 * | 12/2009 | Chang | 248/176.3 |

FOREIGN PATENT DOCUMENTS

| | | |
|---|---|---|
| DE | 29720612 U1 | 3/1998 |
| DE | 10307553 A1 | 10/2003 |
| WO | WO2007/036761 A1 | 4/2007 |
| WO | WO2008/128586 A1 | 10/2008 |

* cited by examiner

*Primary Examiner* — Anita M King
(74) *Attorney, Agent, or Firm* — Keith L. Jenkins, Registered Patent Attorney, LLC; Keith L. Jenkins

(57) ABSTRACT

A collapsible and adjustable electronics support with a releasably lockable rotatable base having a link with adjustable drag hinges connecting the releasably lockable rotatable base to a receiver for a polygonal support adapter. One or two tools for adjusting the drag hinges are included with first and second releasably snap-fit covers for respective first and second link sides of the link. The covers also cover the adjustable device in the drag hinge ends. The releasably lockable rotatable base is a four-part base with an adhesive part, a flexible and resilient panel supporting an axle, a first rigid panel rotationally fixed relative to the flexible and resilient panel, and a second rigid panel that rotates relative to the first rigid panel. The low profile in a collapsed configuration avoids rubbing the environmental surface to which it is attached. Wire management guides are provided on the receiver.

21 Claims, 8 Drawing Sheets

COLLAPSIBLE AND ADJUSTABLE ELECTRONICS SUPPORT SYSTEMS

FIELD OF THE INVENTION

This invention relates to collapsible and adjustable electronics support. More particularly, it relates to collapsible and adjustable electronics supports having adjustable drag hinges, a integral tool for adjusting the drag hinges, a wire management guide, and a flexible base that can adhere to curved surfaces, such as vehicle dashboards.

BACKGROUND

The rise in popularity of dashboard-mounted electronic devices such as GPS receivers, music players, and cellular telephones, to name a few, has led to the need for supports for such electronic devices. The supports typically adhere to the dashboard or instrument panel of the vehicle using adhesive or suction cups, and extend by a hinged chain to a desired position. Some supports have swivel bases.

Supports using drag hinges loosen with use, eventually making the support ineffective. Likewise, many supports lack a flexible base and cannot conform to the curvature of a dashboard, making the attachment to the dashboard weak and likely to fail during rapid acceleration or braking.

International patent application WO2008/128586 A1 to Buchhalter describes a flexible mounting plate for conforming to the dash curvature that is functional for mildly concave surfaces, but not for convex or more concave sections of a dash. Buchhalter's base rubs the dash when rotated. Buchhalter recites adjustable drag hinges but does not provide means for adjusting them. Buchhalter has a retaining clip that locks and unlocks the electronic device in place by rotation, allowing a torque during a crash to disconnect the device from the holder. Buchhalter does not disclose wire management guides.

Therefore, a need exists for a device support that can conform to a wider range of concavity and convexity of mounting surfaces, provides means for adjusting the drag hinges, avoids rubbing the dash when rotated, has a more secure retainer mechanism, and provides wire management guides for wires associated with the device to be supported.

OBJECTS AND FEATURES OF THE INVENTION

A primary object and feature of the present invention is to overcome the above-mentioned problems and fulfill the above-mentioned needs.

Another object and feature of the present invention is to provide a device holder with a base that does not rub the dash when rotated. It is a further object and feature of the present invention to provide a device holder having an integral tool for adjusting the drag hinges to compensate for wear and for weights of various devices to be held. It is a further object and feature of the present invention to provide a device holder that has wire management guides. It is a further object and feature of the present invention to provide a device holder that is adaptable to a wider range of curved surfaces. It is a further object and feature of the present invention to provide a device holder with a more secure retainer mechanism. It is a further object and feature of the present invention to provide a device holder that can be folded down to a low profile, folded up to various higher profiles, and maintain any profile chosen. It is a further object and feature of the present invention to provide a device holder that integrates these features into a single device holder.

It is an additional primary object and feature of the present invention to provide such a system that is efficient, inexpensive and handy. Other objects and features of this invention will become apparent with reference to the following descriptions.

SUMMARY OF THE INVENTION

In accordance with a preferred embodiment hereof, this invention provides a collapsible and adjustable electronics support, including: a releasably lockable rotatable base able to adhere conformally to curved surfaces; a link having first and second ends, the first end rotationally coupled to the lockable rotatable base with a base adjustable drag hinge; and a receiver for a polygonal support adapter, the receiver rotationally coupled to the second end of the link with a receiver adjustable drag hinge, where the receiver includes wire management guides protruding from an underside of the receiver. The collapsible and adjustable electronics support, where the link includes first and second link sides, the collapsible and adjustable electronics support further including first and second releasably snap-fit covers for the respective first and second link sides of the link, where at least the first releasably snap-fit cover includes a tool that is manually operable for adjusting the adjustable drag hinges. The collapsible and adjustable electronics support, where the base adjustable drag hinge has first and second ends corresponding to the first and second link sides; the receiver adjustable drag hinge has first and second ends corresponding to the first and second link sides; the first releasably snap-fit cover, when installed, extends to cover the base and receiver adjustable drag hinge first ends; and the second releasably snap-fit cover, when installed, extends to cover the base and receiver adjustable drag hinge second ends. The collapsible and adjustable electronics support, where the tool extends orthogonally from at least the first releasably snap-fit cover and is received, when the first releasably snap-fit cover is snap-fit to the first link side, within an opening in the first link side. The collapsible and adjustable electronics support, where the tool includes a hex key and the base adjustable drag hinge and the receiver adjustable drag hinge each comprise a hex socket bolt. The collapsible and adjustable electronics support, where the releasably lockable rotatable base further includes a first base element including a first, distally threaded, axle coupled orthogonally to a first resilient web; an asymmetric protrusion from the first resilient web; an adhesive second resilient web, able to adhere to the first resilient web and to an environmental surface; a second base element having top and bottom surfaces, the second base element including a first rigid web having an opening adapted to pass the axle; a cavity on the bottom surface adapted to receive the asymmetric protrusion of the first resilient web; and a rotationally symmetric protrusion on the top surface centered on the opening; a rotatable third base element adapted to rotate freely on the axle and including: a support for the base adjustable drag hinge; and a bottom surface having a rotationally symmetric cavity corresponding to the rotationally symmetric protrusion; and a nut including threads adapted to the axle and useful to urge the third base element against the second base element to prevent rotation of the third base element about the axle or to release the urging to allow rotation of the third base element about the axle. The collapsible and adjustable electronics support, where the rotatable third base element includes a notch sized, shaped, and arranged to receive at least a portion of the wire management guides in a collapsed configuration and to receive at least a portion of a human finger tip for assisting in rotating the rotatable third base element in a deployed configuration. The collapsible and adjustable electronics support, where the base includes a width less than a width between the first and second link sides. The collapsible and adjustable electronics support, further including a rigid web extending in width from the first link side to the second link side of the link, and extending in length from the base adjustable drag hinge to a length complimentary to the receiver when the receiver is in a collapsed configuration. The collapsible and adjustable electronics support, further including the support adapter able to be attached to a device to be supported, where the receiver is sized, shaped, and arranged to slidingly, latchingly, releasably, and not rotationally receive the support adapter. The collapsible and adjustable electronics support, where the device to be supported includes an electronic device, a holder for an electronic device, or a non-electronic device.

A collapsible and adjustable electronics support, including: a releasably lockable rotatable base; a link having first and second ends, the first end rotationally coupled to the lockable rotatable base with a base adjustable drag hinge, where the link includes first and second link sides; a polygonal receiver rotationally coupled to the second end of the link with a receiver adjustable drag hinge, where the polygonal receiver includes wire management guides, and first and second releasably snap-fit covers for the respective first and second sides of the link, where at least the first releasably snap-fit cover includes a tool that is useful for adjusting the adjustable drag hinges. The collapsible and adjustable electronics support, further including a rigid web extending in width from the first link side to the second link side of the link, and extending in length from the base adjustable drag hinge to a length complimentary to the receiver when the receiver is in a collapsed configuration. The collapsible and adjustable electronics, further including a support adapter able to be attached to a device to be supported, where the receiver is sized, shaped, and arranged to slidingly, latchingly, releasably, and not rotationally receive the support adapter. The collapsible and adjustable electronics support, where the device to be supported includes an electronic device, a holder for an electronic device, and a non-electronic device. The collapsible and adjustable electronics support, further including first and second releasably snap-fit covers for the respective first and second link sides of the link, where at least the first releasably snap-fit cover includes a tool that is useful for adjusting the adjustable drag hinges.

A collapsible and adjustable electronics support, including: a first base element including a first, distally threaded, axle coupled orthogonally to a first resilient web; an asymmetric protrusion from the first resilient web; an adhesive second resilient web, able to adhere to the first resilient web and to an environmental surface; a second base element including a first rigid web having an opening adapted to pass the axle and a cavity adapted to receive the asymmetric protrusion; a rotatable third base element adapted to freely rotate on the axle and including a base adjustable drag hinge; a nut including threads adapted to the first axle and manually operable to urge the third base element against the second base element to prevent rotation of the third base element about the axle or to release the urging to allow rotation of the third base element about the axle; the base adjustable drag hinge including a housing, and first and second generally parallel arms extending from opposing ends of the housing, the first and second arms adapted at distal ends for supporting a receiver adjustable drag hinge; the receiver adjustable drag hinge including a receiver drag hinge housing, and a receiver extending from the receiver drag hinge housing; the receiver, able to rotate about the receiver adjustable drag hinge within collapsed and deployed limits, to slidingly, latchingly, releasably, and not rotationally receive a support adapter, and to assist in management of a wire; a cover for an arm of the first and second arms, the cover including a tool for adjusting the base adjustable drag hinge and the receiver adjustable drag hinge; and where the base adjustable drag hinge and the receiver adjustable drag hinge are able to manipulate the collapsible and adjustable electronics support between a collapsed configuration and a plurality of deployed configurations. The collapsible electronics support, further including a rigid web supported between the first and second arms proximal the base drag hinge and distal the second base element, and extending to be able to receive an edge of the receiver at the collapsed rotational limit of the receiver. The collapsible and adjustable electronics support, where the tool extends orthogonally from the cover and is received, when the cover is on the arm, within an opening in the arm. The collapsible and adjustable electronics support, where the base adjustable drag hinge has first and second ends corresponding to the first and second arms; the receiver adjustable drag hinge has first and second ends corresponding to the first and second arms; the first releasably snap-fit cover extends to cover the base and receiver adjustable drag hinge first ends; and the second releasably snap-fit cover extends to cover the base and receiver adjustable drag hinge second ends.

The novel aspects of this invention are intended to improve the state of the art in electronic device supports.

BRIEF DESCRIPTION OF THE DRAWINGS

The above and other objects and advantages of the present invention will become more apparent from the following description taken in conjunction with the following drawings in which.

DETAILED DESCRIPTION OF THE BEST MODES AND PREFERRED EMBODIMENTS OF THE INVENTION

As used and defined herein, a "drag hinge" is a hinge that is frictionally constrained in its motion, conventionally by friction between opposed outer portions of a hinge housing against an aligned inner portion of a hinge housing, wherein the hinge pin is a bolt. In an adjustable drag hinge, the hinge pin bolt may be tightened to increase friction or loosened to decrease friction. As used and defined herein, a "base adjustable drag hinge" is the adjustable drag hinge coupled integral to the base. As used and defined herein, a "receiver adjustable drag hinge" is the adjustable drag hinge coupled to integral to the receiver.

Figure 1:
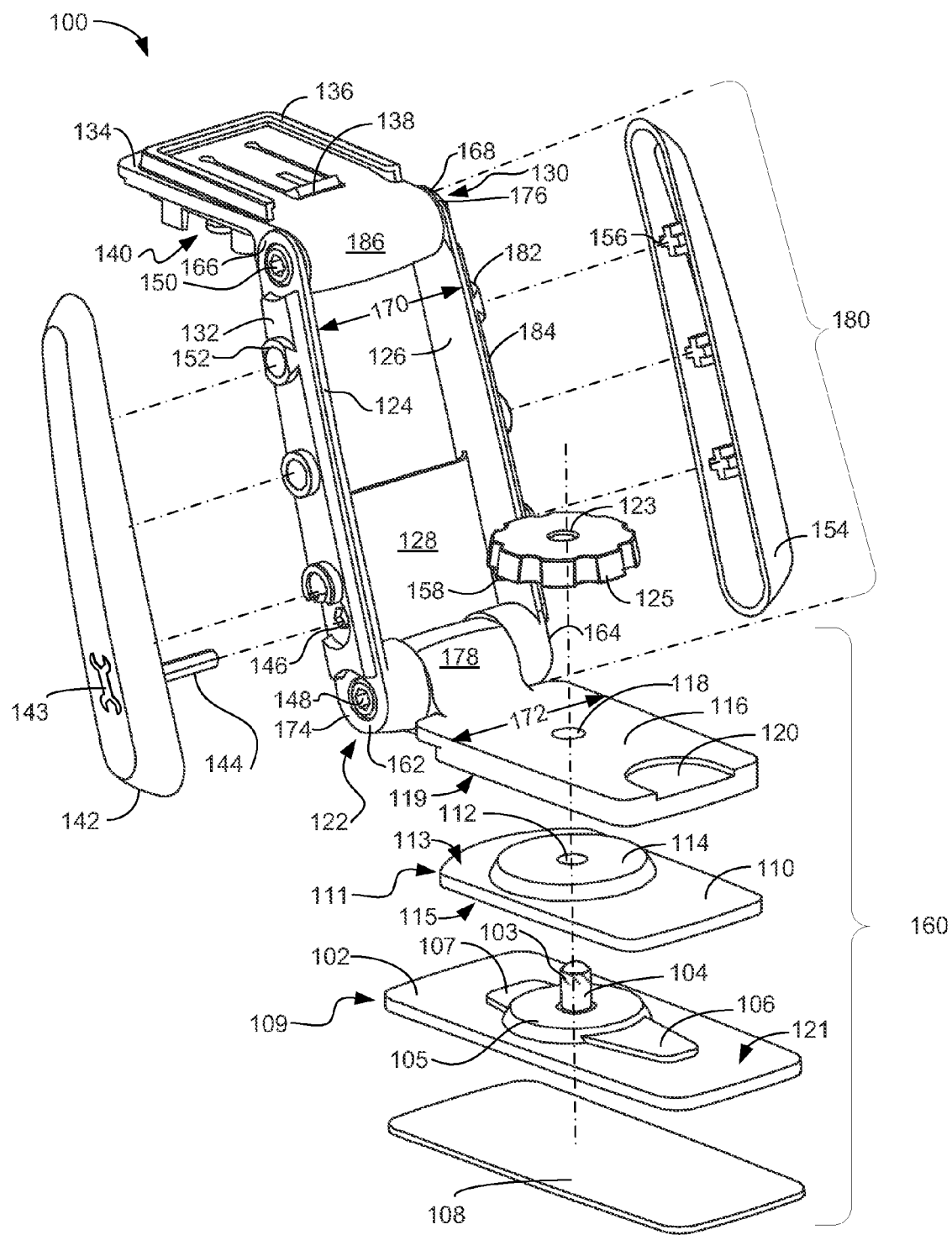
FIG. 1 is an exploded perspective view illustrating an exemplary collapsible and adjustable electronics support system, according to a preferred embodiment of the present invention.

FIG. 1 is an exploded perspective view illustrating an exemplary collapsible and adjustable electronics support system 100, according to a preferred embodiment of the present invention. The collapsible and adjustable electronics support 100, includes a releasably lockable rotatable base 160 operable to adhere conformally to curved surfaces (see FIG. 8); a link 180 having first and second ends 174 and 176, the first end 174 rotationally coupled to the lockable rotatable base 160 with a base adjustable drag hinge 122; and a receiver 134 for a polygonal support adapter 402 (see FIG. 4), the receiver 134 rotationally coupled to the second end 176 of the link 180 with a receiver adjustable drag hinge 130. The receiver 134 includes wire management guides 140 protruding from an underside of the receiver 134. The link 180 includes first and second link sides, or arms, 124 and 126.

The receiver 134 is a polygonal (shown as a rectangle) extension from the receiver drag hinge housing 186 having, on a first side, a channel 136 comprising a portion of a polygon for receiving a support adapter 402 and having a polygonal shape complimentary to the shape of the support adapter 402. Receiver 134 further includes, on the first side, a latch 138, shown as a resilient cantilever tab having a protrusion. Wire management guides 140 protrude from or are attached to the second side, or underside, of the receiver 134.

The collapsible and adjustable electronics support 100 further includes first and second releasably snap-fit covers 142 and 154 for the respective first and second link sides 124 and 126 of the link 180. Snap fittings 132 and 184 have a plurality, preferably three, snap-fit receivers 152 and 182 (one of three labeled on each link side 124 and 126). Snap-fit receivers 152 and 182 may be generally annular protrusions that are shaped on their exteriors to accommodate such features as snap-fit covers 142 and 154, respectively, and opening 146. The snap fit receivers 152 and 182 receive snap-fit pins 156 (one of three labeled in releasable snap-fit cover 154), which are resilient but deformable. Releasably snap-fit cover 142 also has snap-fit pins 156 (not shown). Snap fitting 132 and snap-fit receivers 152 are preferably integrally molded as one piece with first link side 124. Snap fitting 184 and snap-fit receivers 182 are preferably integrally molded as one piece with second link side 126.

At least the first or second releasably snap-fit cover 142 includes a tool 144 that is manually operable for adjusting the adjustable drag hinges 122 and 130. Snap-fit cover 142 with tool 144 preferably has icon 143 indicating that that first releasably snap-fit cover 142 has a tool 144. The icon 143 is preferably molded in, but may be applied or engraved in various embodiments. Icon 143 is preferably in the shape of a wrench, as shown, but may, in various alternate embodiments, be of various designs, letters, or words. In some instances, first and second snap fit covers 142 and 154 have tools 144 and icons 143. The base adjustable drag hinge 122 has first and second ends 162 and 164 corresponding to the first and second link sides 124 and 126, respectively. The receiver adjustable drag hinge 130 has first and second ends 166 and 168 corresponding to the first and second link sides 124 and 126, respectively. The first releasably snap-fit cover 142, when installed, extends to cover the base and receiver adjustable drag hinge first ends 162 and 166. The second releasably snap-fit cover 154, when installed, extends to cover the base and receiver adjustable drag hinge second ends 164 and 168.

The tool 144 extends orthogonally from at least the first releasably snap-fit cover 142 and is received, when the first releasably snap-fit cover is snap-fit to the first link side 124, within an opening 146 in the first link side 124. The tool 144 is preferably a hex key 144 and the base adjustable drag hinge 122 and the receiver adjustable drag hinge 130 preferably each have a hex socket bolt 148, 150 as a hinge pin. In alternate embodiment, various tool 144 and socket bolt 148 types, as are known in the art, may be used.

When a first adjustment of the drag hinge 122 is performed, tool 144 is inserted in the hinge-pin bolt 148 and the hinge-pin bolt 148 is tightened to urge first and second ends 162 and 164 of base adjustable drag hinge 122 inward toward base adjustable drag hinge housing 178, which is an extension of rotatable third base element 116. The inward urging increases friction between first and second ends 162 and 164 and the base adjustable drag hinge housing 178, thereby stiffening the base adjustable drag hinge 122. Loosening the hinge-pin bolt 148 reduces friction between first and second ends 162 and 164 and the base adjustable drag hinge housing 178, thereby loosening the base adjustable drag hinge 122.

When a first adjustment of the drag hinge 130 is performed, tool 144 is inserted in the hinge-pin bolt 150 and the hinge-pin bolt 150 is tightened to urge first and second ends 166 and 168 of receiver adjustable drag hinge 130 inward toward receiver adjustable drag hinge housing 186, which is an extension of receiver 134. The inward urging increases friction between first and second ends 166 and 168 and the receiver adjustable drag hinge housing 186, thereby stiffening the receiver adjustable drag hinge 130. Loosening the hinge-pin bolt 150 reduces friction between first and second ends 166 and 168 and the receiver adjustable drag hinge housing 186, thereby loosening the receiver adjustable drag hinge 130.

Figures 2, 3:
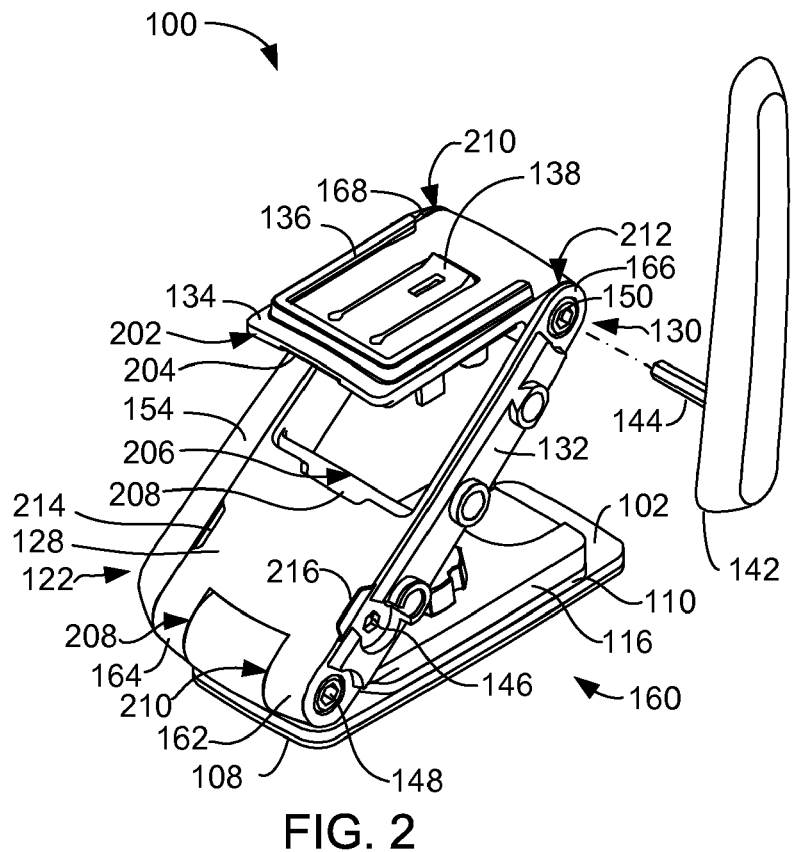
FIG. 2 is a perspective view illustrating exemplary adjustment of the receiver adjustable drag hinge of the exemplary collapsible and adjustable electronics support system of FIG. 1, according to a preferred embodiment of the present invention.
FIG. 3 is a perspective view illustrating exemplary wire management guides of the exemplary collapsible and adjustable electronics support system of FIG. 1, according to a preferred embodiment of the present invention.

Opening 146 preferably receives the tool 144 slidingly. In an alternate embodiment, the opening 146 may be oversized to allow entry of the tool 144 without contact with the walls of the opening 146. Opening 158, barely visible under the edge of nut 125 but more clearly seen in FIG. 3, is like opening 146 and can accommodate a second tool 144 (not shown) in releasably snap-fit cover 154. There may be some preferences, as between right-handed and left-handed users, as to which link side 124 or 126 the releasably snap-fit cover 142 with tool 144 is attached. In a particular embodiment, the releasably snap-fit covers 142 and 154 are interchangeable, and the user can select which link side 124 or 126 has the releasably snap-fit cover 142 with the tool 144. In another particular embodiment, both releasably snap-fit covers 142 and 154 have tools 144.

The releasably lockable rotatable base 160 further includes a first base element 109 including a first, distally threaded 103, axle 104 coupled orthogonally to a first resilient web 102. Distal threads 103 allow rotation of the rotatable third base element 116 around the smooth portion of axle 104, while still providing threads for engaging the nut 125. This is particularly important in preferred embodiments where the material of axle 104 (i.e. metal) is harder than the material of the rotatable third base element 116 (i.e. plastic), as the harder sharp threads would cut the softer material in rotation, accelerating wear. In an alternate embodiment in which the materials of the axle 104 and the rotatable third base element 116 have the same hardness, the threads 103 may cover the entire axle 104. It will be obvious to those of skill in the art, enlightened by this disclosure, that the longer axle 104 is made, the deeper a convex environmental surface may be used as a mounting surface.

At least one asymmetric protrusion 106, 107 and a radially symmetric protrusion 105, centered on the axle 104, protrude from the first resilient web 102. The purpose of the asymmetric protrusions 106 and 107 is to prevent rotation of second base element 111 relative to first base element 109, as will become more apparent in the discussion below. Top surface 121 of first base element 109 abuts the bottom surface 115 of second base element 111.

The releasably lockable rotatable base 160 includes an adhesive second resilient web 108, able to adhere to the first resilient web 102 and to an environmental surface. The adhesive is preferably an adhesive that remains stable at high temperatures, preferably to at least 165° Fahrenheit, and more preferably to at least 180° Fahrenheit, as such temperatures can be reached inside closed, parked vehicles in the American Desert Southwest in summer. This avoids the problem observed with some prior art dash mountings, of the adhesive melting and running down the dashboard onto the instrument panel and floor, leaving an unsightly stain that is very difficult to remove. In a preferred embodiment, adhesive second resilient web 108 is packaged adhered to first base element 109, with a removable cover on the remaining adhesive side of adhesive second resilient web 108.

A second base element 111 having top 113 and bottom 115 surfaces includes a first rigid web 110 having an opening 112 adapted to pass the axle 104. A cavity 702 (see FIG. 7) on the bottom surface 115 is adapted to receive the asymmetric protrusions 106, 107 of the first base element 109. Second base element 111 also has a rotationally symmetric protrusion 114 on the top surface 113 centered on the opening 112. Opening 112 is sized to pass axle 104.

A rotatable third base element 116 is adapted to rotate freely on the axle 104 using base opening 118 and includes base adjustable drag hinge housing 178, base opening 118, notch 120, and a bottom surface 119 having a rotationally symmetric cavity 704 (see FIG. 7) corresponding to the rotationally symmetric protrusion 114 of second base element 111. A nut 125 including threads adapted to the threads 103 of axle 104 is useful to urge the third base element 116 against the second base element 111 to prevent rotation of the third base element 116 about the axle 104 or to release the urging to allow rotation of the third base element 116 about the axle 104. Through hole 123 in nut 125 enables axle 104 to extend above the top of the nut 125 when the collapsible and adjustable electronics support system 100 is mounted on a concave surface, thereby having a long enough axle 104 mounting the collapsible and adjustable electronics support system 100 on a convex surface. The rotatable third base element 116 includes a notch 120 sized, shaped, and arranged to receive at least a portion of the wire management guides 140 in a collapsed configuration (see FIGS. 9-10) and to receive at least a portion of a human finger tip for assisting in rotating the rotatable third base element 116 in a deployed configuration (see FIGS. 2-8 and 11-14).

The releasably lockable rotatable base 160 includes a base width 172 less than an inside link width 170 between the first and second link sides 124 and 126. The relationship between inside link width 170 and base width 172 enables the link 180 to be folded over releasably lockable rotatable base 160 to reduce the vertical profile of the collapsible and adjustable electronics support system 100 in a collapsed configuration.

Figure 9:
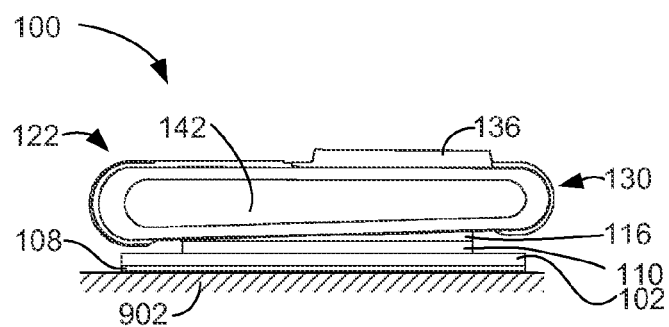
FIG. 9 is a side elevation view illustrating the exemplary collapsible and adjustable electronics support system of FIG. 1 in an exemplary collapsed configuration, according to a preferred embodiment of the present invention.
Figure 10:
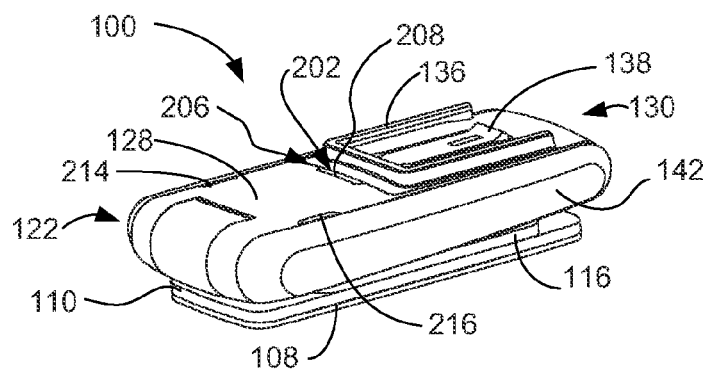
FIG. 10 is a perspective view illustrating the exemplary collapsible and adjustable electronics support system of FIG. 1 in the exemplary collapsed configuration of FIG. 9, according to a preferred embodiment of the present invention.

The collapsible and adjustable electronics support 100 further includes a rigid web 128 extending in width from the first link side 124 to the second link side 126 of the link 180, and extending in length from the base adjustable drag hinge housing 178 to a length complimentary to the receiver 134 when the receiver 134 is in a collapsed configuration (see FIGS. 9-10). The receiver 134 and the web 128 form a cover, in the collapsed configuration, for the collapsible and adjustable electronics support system 100.

FIG. 2 is a perspective view illustrating exemplary adjustment of the receiver adjustable drag hinge 130 of the exemplary collapsible and adjustable electronics support system 100 of FIG. 1, according to a preferred embodiment of the present invention. Releasably snap-fit cover 142 serves as a wrench handle for hex key tool 144. When a first adjustment of the drag hinge 130 is performed, tool 144 is inserted in the hinge-pin bolt 150 and the hinge-pin bolt 150 is tightened to urge first and second ends 166 and 168 of receiver adjustable drag hinge 130 inward toward receiver adjustable drag hinge housing 186, which is an extension of receiver 134. The inward urging increases friction between first and second ends 166 and 168 and the receiver adjustable drag hinge housing 186 at friction joints 212 and 210, respectively, thereby stiffening the receiver adjustable drag hinge 130. Loosening the hinge-pin bolt 150 reduces friction between first and second ends 166 and 168 and the receiver adjustable drag hinge housing 186 at friction joints 212 and 210, respectively, thereby loosening the receiver adjustable drag hinge 130.

When a similar first adjustment of the drag hinge 122 is performed, using the same tool 144, tool 144 is inserted in the hinge-pin bolt 148 and the hinge-pin bolt 148 is tightened to urge first and second ends 162 and 164 of base adjustable drag hinge 122 inward toward base adjustable drag hinge housing 178, which is an extension of rotatable third base element 116. The inward urging increases friction between first and second ends 162 and 164 and the base adjustable drag hinge housing 178 at friction joints 210 and 208, respectively, thereby stiffening the base adjustable drag hinge 122. Loosening the hinge-pin bolt 148 reduces friction between first and second ends 162 and 164 and the base adjustable drag hinge housing 178 at friction joints 210 and 208, respectively, thereby loosening the base adjustable drag hinge 122.

Edge 202 of receiver 134 is shaped to complement edge 206 of web 128. Indentation 204 in edge 202 compliments indentation 208 in edge 206 to improve the ease of opening receiver 134 from a collapsed configuration, as with a fingernail. In various other embodiments, various other indentations or protrusions may be used for the same purpose. Obviously, the channel 136 may be used for the same purpose, either by receiving a fingernail when empty or using the device being held as a tool to exert the opening force. Indentations 214 and 216 may also be used to assist in opening the collapsible and adjustable electronics support system 100.

FIG. 3 is a perspective view illustrating exemplary wire management guides 140 of the exemplary collapsible and adjustable electronics support system 100 of FIG. 1, according to a preferred embodiment of the present invention. Wire 302 may be a power, data, or signal conduit, depending on the type of device being supported. Wire 302 may be frictionally retained by routing side-to-side between first guide 304 and a gap between second guide 306 and side movement impediment 310, and then down-to-up between second guide 306 and third guide 308, as shown. First guide 304 may be affixed to receiver 134 with screws, as shown, or may be affixed by other means, or molded as part of receiver 134. Those of skill in the art, enlightened by the present disclosure, will appreciate the many different forms that wire guides 140 may take, all of which are within the scope of the present invention.

Figure 4:
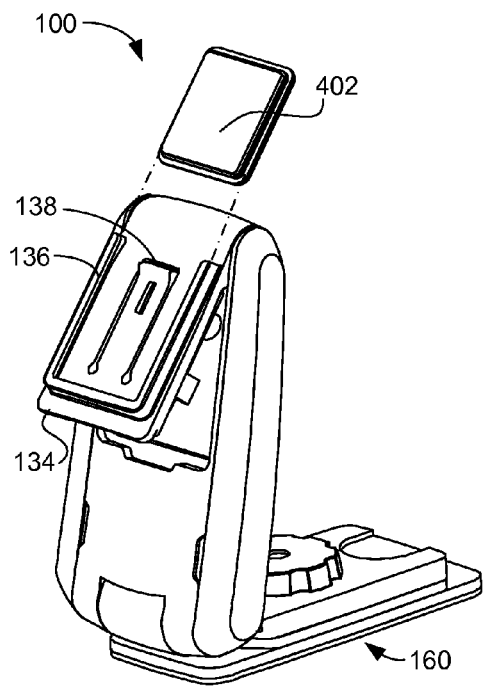
FIG. 4 is a perspective view illustrating the exemplary uninstalled support adapter of the exemplary collapsible and adjustable electronics support system of FIG. 1, according to a preferred embodiment of the present invention.

FIG. 4 is a perspective view illustrating the exemplary uninstalled support adapter 402 of the exemplary collapsible and adjustable electronics support system 100 of FIG. 1, according to a preferred embodiment of the present invention. The collapsible and adjustable electronics support includes the support adapter 402 which is operable to be attached to a device to be supported (such as a cell phone, GPS navigation device, or music player), where the receiver 134 is sized, shaped, and arranged to slidingly (see lip 136), latchingly (see 138), releasably (see 138), and not rotationally (see 136) receive the support adapter 402. Support adapter 402 may be affixed to the device to be supported by permanent or temporary adhesives, fasteners of various sorts, or may be molded into the device or into a holder for the device.

Figure 5:
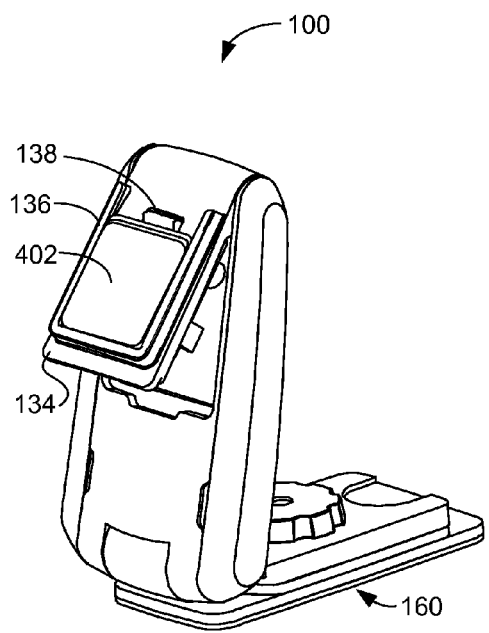
FIG. 5 is a perspective view illustrating the exemplary installed support adapter of FIG. 4 of the exemplary collapsible and adjustable electronics support system of FIG. 1, according to a preferred embodiment of the present invention.

FIG. 5 is a perspective view illustrating the exemplary installed support adapter 402 of FIG. 4 of the exemplary collapsible and adjustable electronics support system 100 of FIG. 1, according to a preferred embodiment of the present invention. The support adapter 402 is slid under lip 136 and latched into position by latch 138. To release latch 138, it may be manually depressed while the support adapter 402 is slid out of lip 136 of the receiver 134. In some embodiments, a tool or implement may be used to depress latch 138. For example, if the clearance between the device to be supported and the latch 138 is too narrow for a human digit, a screwdriver, pen knife, or even tool 144 may be used to release latch 138.

Figure 6:
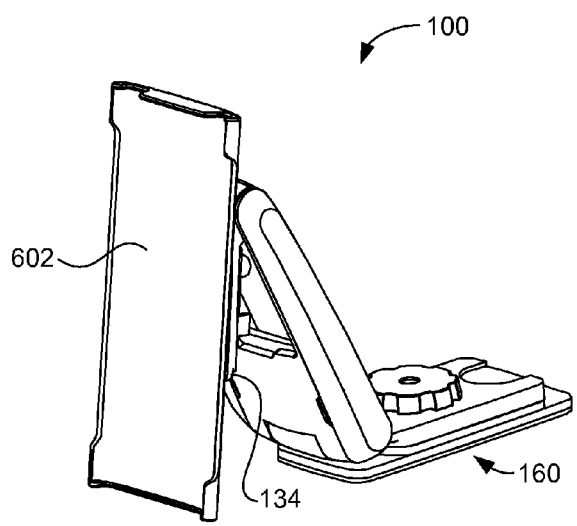
FIG. 6 is a perspective view illustrating an exemplary holder for an electronic device used with the exemplary collapsible and adjustable electronics support system of FIG. 1, according to a preferred embodiment of the present invention.

FIG. 6 is a perspective view illustrating an exemplary holder 602 for an electronic device used with the exemplary collapsible and adjustable electronics support system 100 of FIG. 1, according to a preferred embodiment of the present invention. The collapsible and adjustable electronics support 100 may support an electronic device, a holder 602 for an electronic device, or a non-electronic device. The holder 602, illustrated as an iPod® holder 602, or cradle, has support adapter 402 affixed the rear side (not visible in this view), and support adapter 402 is latched into receiver 134, as shown in FIG. 5.

Figure 7:
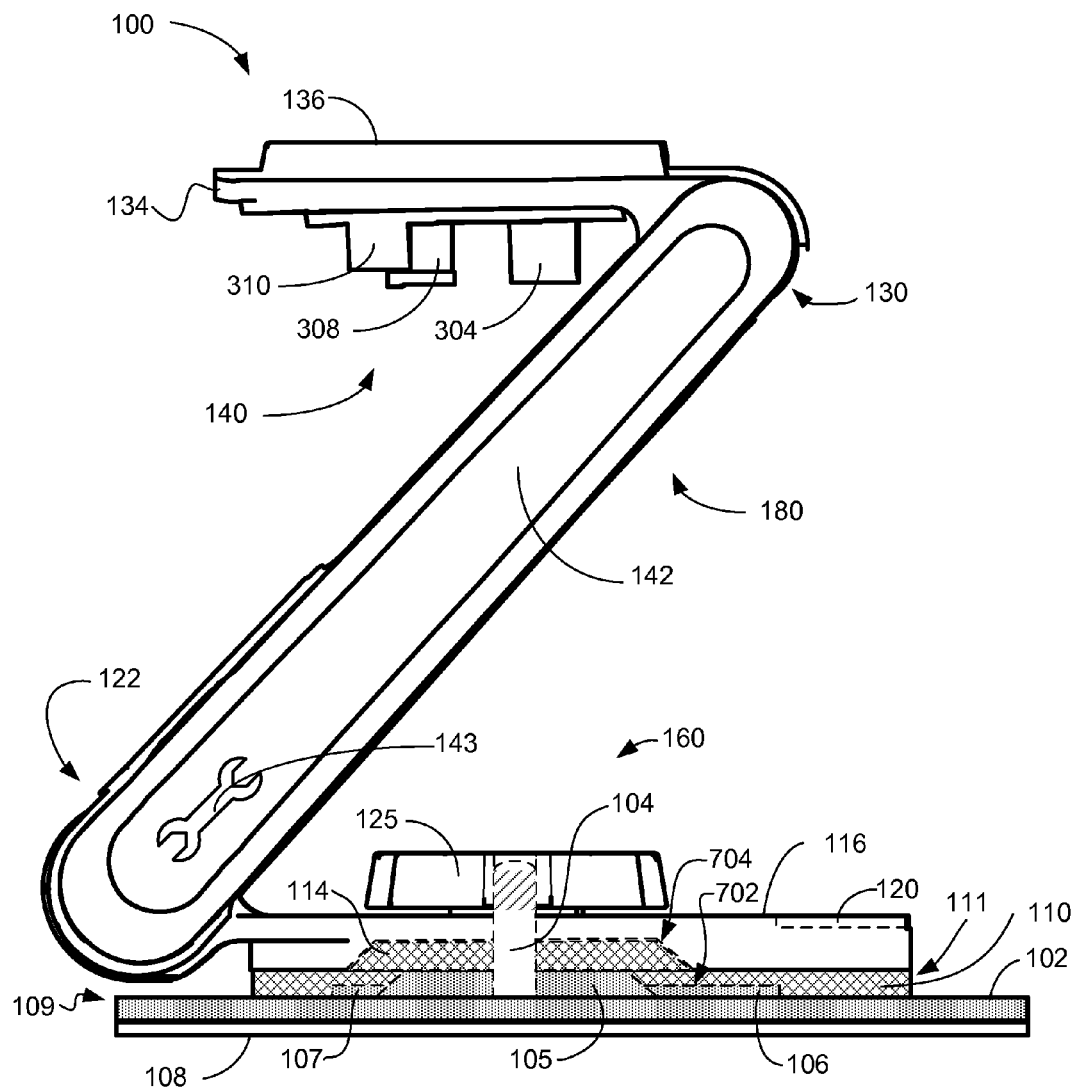
FIG. 7 is a side elevation view with a cross-section of the base illustrating the exemplary collapsible and adjustable electronics support system of FIG. 1, according to a preferred embodiment of the present invention.

FIG. 7 is a side elevation view with a cross-section of the base 160 illustrating the exemplary collapsible and adjustable electronics support system 100 of FIG. 1, according to a preferred embodiment of the present invention. Releasably lockable rotatable base 160 is coupled to link 180 by base adjustable drag hinge 122. Link 180 is coupled to receiver 134 by receiver adjustable drag hinge 130. Releasably lockable rotatable base 160 includes an adhesive second resilient web 108, operable to abut and adhere to the first resilient web 102 and to an environmental surface. First resilient web 102, asymmetric protrusions 106, 107, and radially symmetric protrusion 105 make up first base element 109. First rigid web 110, opening 112 (see FIG. 1), and rotationally symmetric protrusion 114 make up second base element 111. At least a portion of top surface 121 of first base element 109 abuts the bottom surface 115 of second base element 111 when the collapsible and adjustable electronics support 100 is mounted on a flat or convex environmental surface. Cavity 702 on the bottom surface 115 of second base element 111 follows the contours of asymmetric protrusions 106, 107 and radially symmetric protrusion 105. On a concave surface, contact between first base element 109 and second base element 111 may be primary between cavity 702 and asymmetric protrusions 106, 107, and radially symmetric protrusion 105.

The top surface 113 of second base element 111 abuts the bottom surface 119 of rotatable third base element 116. Rotationally symmetrical cavity 704 on the bottom surface 119 of rotatable third base element 116 follows the contours of rotationally symmetric protrusion 114 of second base element 111. Rotatable third base element 116 also includes base opening 118, notch 120, and base adjustable drag hinge housing 178. Nut 125 fastens to the threaded portion 103 of axle 104. When sufficiently tightened, nut 125 creates sufficient friction between abutting second base element 111 and rotatable third base element 116 to prevent relative rotation. When sufficiently loosened, nut 125 reduces friction between abutting second base element 111 and rotatable third base element 116 sufficiently to allow relative rotation. Likewise, tightening nut 125 increases friction between first base element 109 and second base element 111 to reduce the likelihood of relative rotation, assisted by the engagement of asymmetrical protrusions 106, and 107 with cavity 702.

Figure 8:
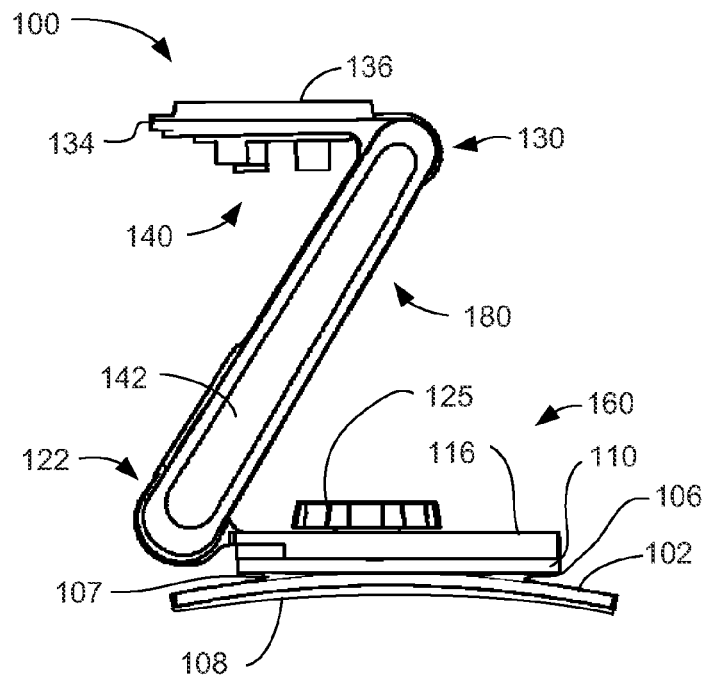
FIG. 8 is a side elevation view illustrating the exemplary collapsible and adjustable electronics support system of FIG. 1 in an exemplary deployed configuration configured for a concave surface, according to a preferred embodiment of the present invention.

FIG. 8 is a side elevation view illustrating the exemplary collapsible and adjustable electronics support system 100 of FIG. 1 in an exemplary deployed configuration configured for a concave environmental surface, according to a preferred embodiment of the present invention. First resilient web 102 bends with adhesive second resilient web 108, such that first resilient web 102 only abuts the first rigid web 110 proximate the center of the bend. Rotation of the first rigid web 110 relative to first resilient web 102 is resisted or limited by asymmetrical protrusions 106 and 107 when nut 125 is tightened.

FIG. 9 is a side elevation view illustrating the exemplary collapsible and adjustable electronics support system 100 of FIG. 1 in an exemplary collapsed configuration, according to a preferred embodiment of the present invention. When fully collapsed, the collapsible and adjustable electronics support system 100 has the low profile shown. The device to be supported may still be attached in this collapsed configuration, which will add to the profile according to the thickness of the device so attached. Receiver 136 can be engaged or disengaged in this collapsed configuration. Releasably snap-fit cover 142 can be released (or installed) in this fully collapsed configuration and tool 144 may be used to tighten or loosen drag hinges 122 and 130 in the fully collapsed configuration. The low profile is achieved, in part, by requiring width 170 to be slightly larger than width 172, so that side arms 124 and 126 partially cover rotatable third base element 116. Enough clearance remains to allow for some convexity in the environmental surface 902. Rubbing of the environmental surface with the base drag hinge 122 is thus avoided.

FIG. 10 is a perspective view illustrating the exemplary collapsible and adjustable electronics support system 100 of FIG. 1 in the exemplary collapsed configuration of FIG. 9, according to a preferred embodiment of the present invention. Nut 125 is inoperable in the fully collapsed configuration, as it is covered by web 128 and receiver 136. Edge 206 of web 128 and edge 202 of receiver 134 meet to form a closure. Edge 202 of receiver 134 is shaped to complement edge 206 of web 128. Indentation 204 in edge 202 of receiver 134 compliments indentation 208 in edge 206 of web 128 to improve the ease of opening receiver 134 from a collapsed configuration, as with a fingernail. Latch 138 is operable in the fully collapsed configuration.

Figure 11:
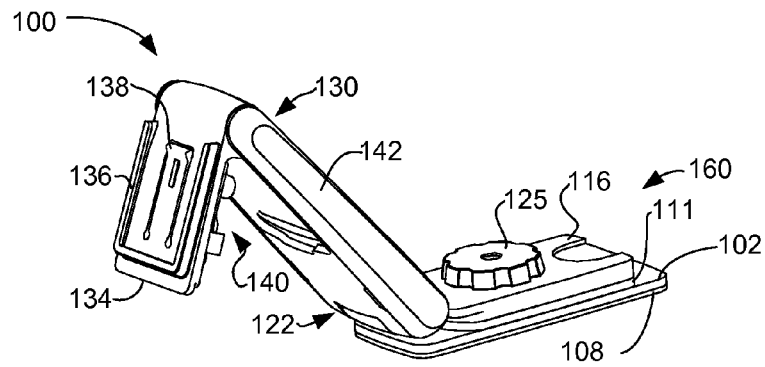
FIG. 11 is a perspective view illustrating the exemplary collapsible and adjustable electronics support system of FIG. 1 in an exemplary deployed configuration, according to a preferred embodiment of the present invention.

FIG. 11 is a perspective view illustrating the exemplary collapsible and adjustable electronics support system 100 of FIG. 1 in an exemplary deployed configuration, according to a preferred embodiment of the present invention. Base drag hinge 122 has an angular range of about 180°. Receiver drag hinge 130 has an angular range of just less than 360°.

Figure 12:
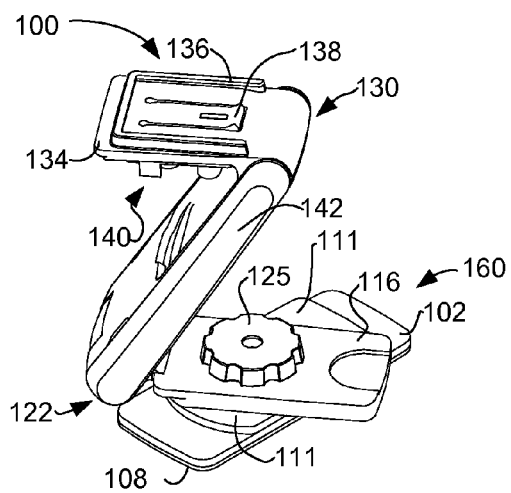
FIG. 12 is a perspective view illustrating the exemplary collapsible and adjustable electronics support system of FIG. 1 in another exemplary deployed configuration, according to a preferred embodiment of the present invention.

FIG. 12 is a perspective view illustrating the exemplary collapsible and adjustable electronics support system 100 of FIG. 1 in another exemplary deployed configuration, according to a preferred embodiment of the present invention. In this configuration, rotatable third base element 116 is rotated by an angle of about 45°, relative to second base element 111. Rotatable third base element 116 has an angular range of 360°.

Figure 13:
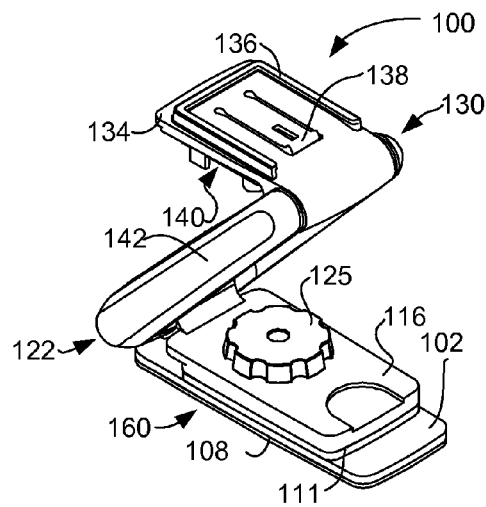
FIG. 13 is a perspective view illustrating the exemplary collapsible and adjustable electronics support system of FIG. 1 in yet another exemplary deployed configuration, according to a preferred embodiment of the present invention.

FIG. 13 is a perspective view illustrating the exemplary collapsible and adjustable electronics support system 100 of FIG. 1 in yet another exemplary deployed configuration, according to a preferred embodiment of the present invention. The configuration with the receiver horizontal may be rare, the receiver position of FIG. 11 being more likely when the collapsible and adjustable electronics support system 100 is mounted on a substantially horizontal environmental surface. However, the collapsible and adjustable electronics support system 100 may be mounted on vertical environmental surfaces as well, in which case the configuration of FIG. 13 may be preferred.

Figure 14:
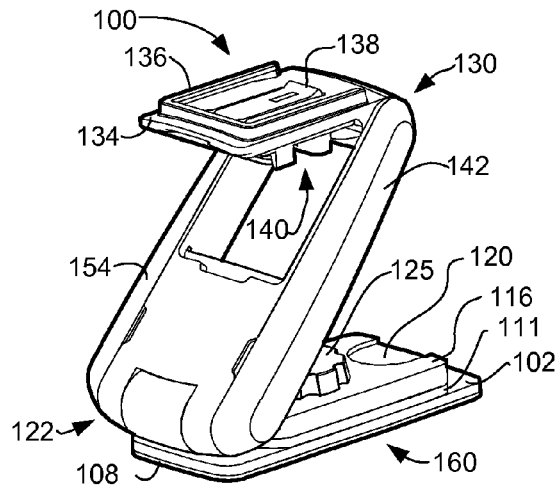
FIG. 14 is a perspective view illustrating the exemplary collapsible and adjustable electronics support system of FIG. 1 in still yet another exemplary deployed configuration, according to a preferred embodiment of the present invention.

FIG. 14 is a perspective view illustrating the exemplary collapsible and adjustable electronics support system 100 of FIG. 1 in still yet another exemplary deployed configuration, according to a preferred embodiment of the present invention. The relationship between the configuration of the wire management guides 140, the notch 120, and the size of nut 125 determine, in part, how far the collapsible and adjustable electronics support system 100 can collapse. Those of skill in the art, enlightened by the present disclosure, will understand various ways that such relationships may be varied to achieve a greater degree of closure.

Figure 15:
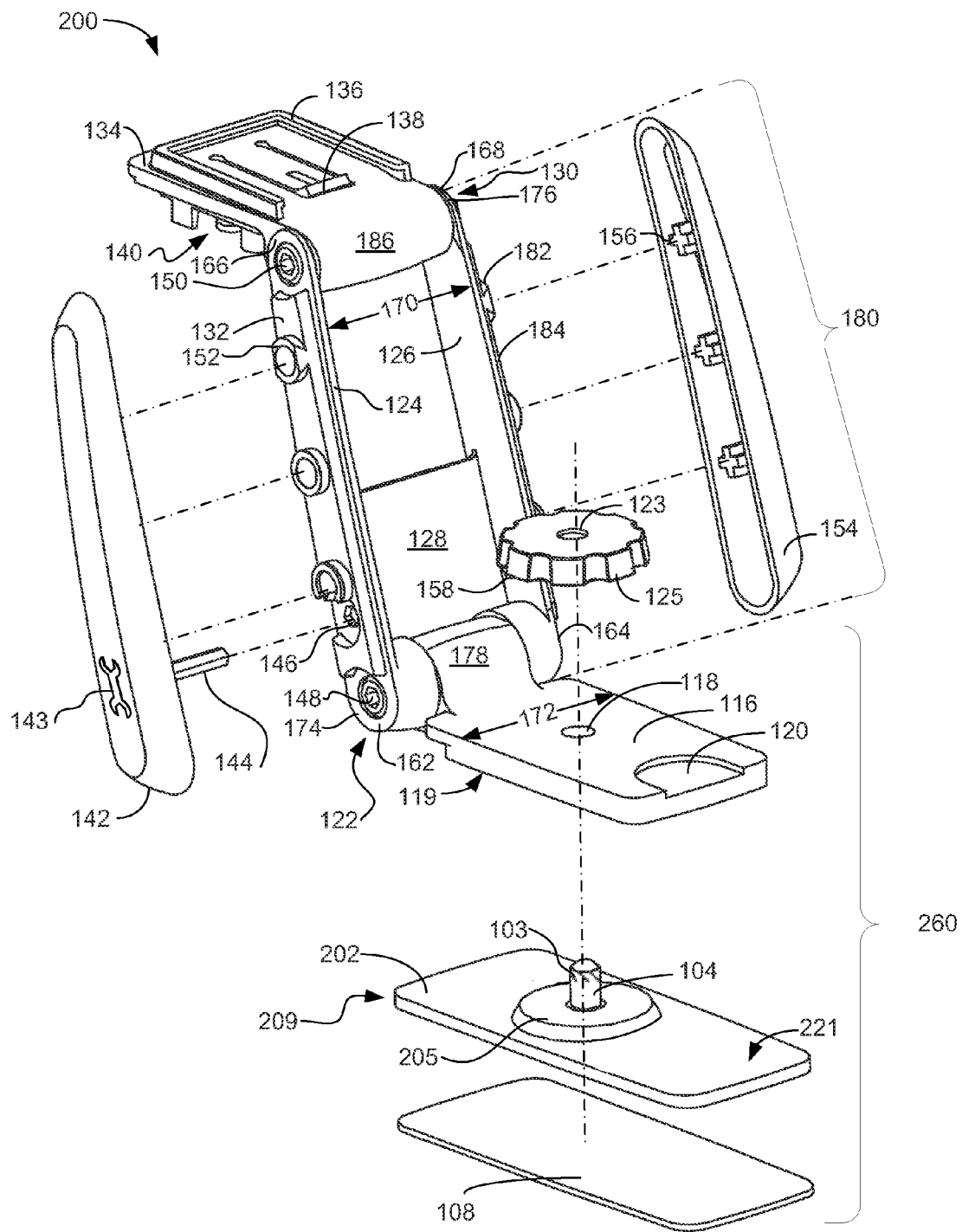
FIG. 15 is an exploded perspective view illustrating another exemplary collapsible and adjustable electronics support system, according to a preferred embodiment of the present invention.

FIG. 15 is an exploded perspective view illustrating another exemplary collapsible and adjustable electronics support system 200, according to a preferred embodiment of the present invention. In this alternate preferred embodiment, base element 111 may be omitted, and first resilient web 202 may be formed from a flexible, deformable metal web co-molded with a resilient material covering, such as hard rubber or soft plastic. The metal web enables the first base element 209 to retain a curved shape when installed on a curved surface, and further supports axle 104. The deformable metal web preferably has multiple perforations. In this alternate preferred embodiment, first base element 209 couples directly to the third (now second) base element 116. Radially symmetric protrusion 205 lacks asymmetric protrusions 106 and 107. Top surface 221 of first resilient web 202 abuts the underside surface 119 of third (now second) base element 116. Second resilient web 108, first base element 209, and third base element (now second) 116 form the rotatable base 260 that can be released to rotate or secured in a fixed position by nut 125 tightening on axle 104.

Figure 16:
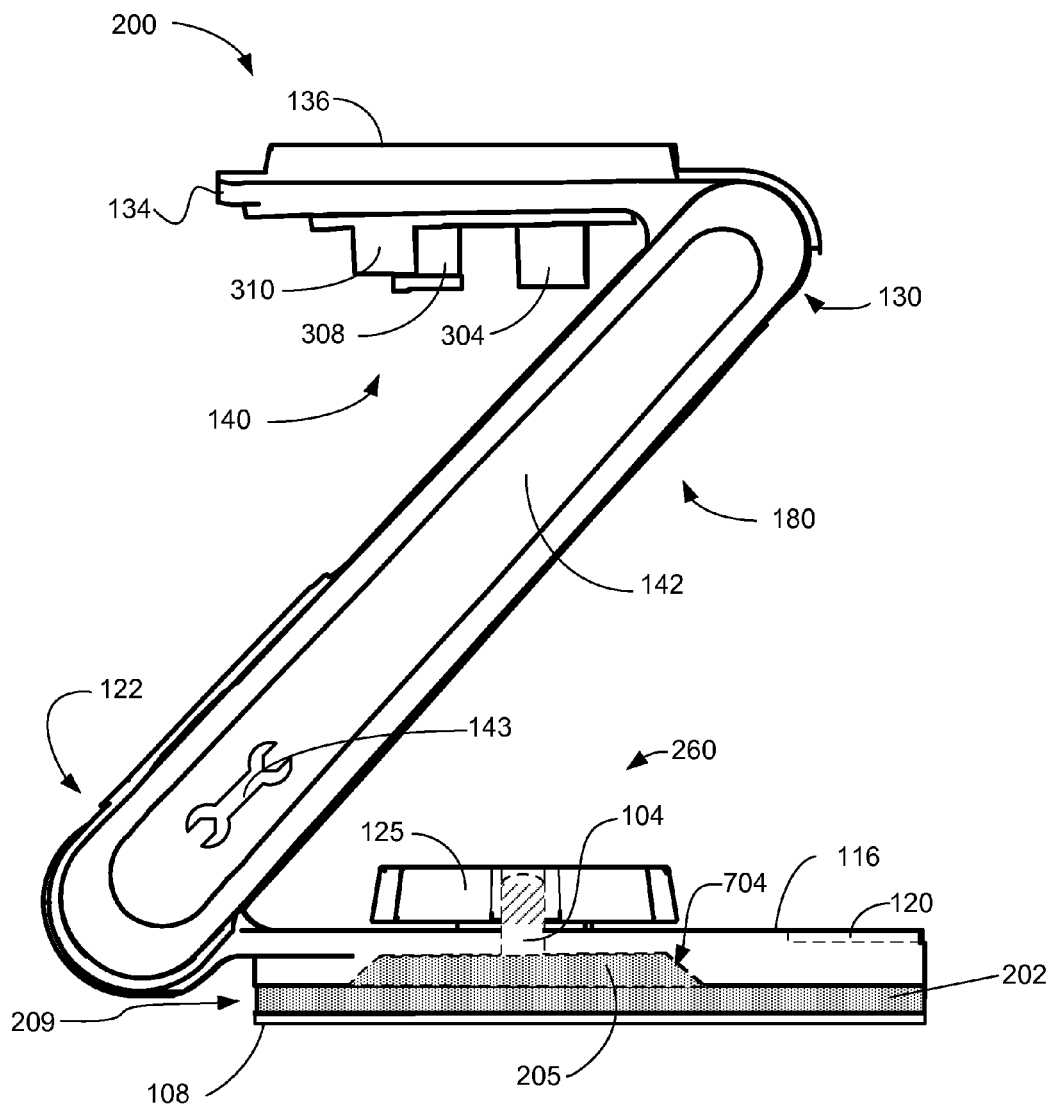
FIG. 16 is a side elevation view with a cross-section of the base illustrating the exemplary collapsible and adjustable electronics support system of FIG. 15, according to a preferred embodiment of the present invention.

FIG. 16 is a side elevation view with a cross-section of the base 260 illustrating the exemplary collapsible and adjustable electronics support system 200 of FIG. 15, according to a preferred embodiment of the present invention. First base element 209 has a radially symmetric protrusion 205 that fits into complimentary radially symmetric cavity 704. Third (now second) base element 116 optionally has cavity 702 for receiving asymmetric protrusions 106 and 107, as shown in FIG. 7. FIG. 16 shows no cavity 702 in third (now second) base element 116. In a production run making both embodiments, it may be preferable to use only one type of base element 116.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims, as interpreted in light of the specification and the legal equivalents thereof.

I claim:

1. A collapsible and adjustable electronics support, comprising:
   a. a releasably lockable rotatable base operable to adhere conformally to curved surfaces;
   b. a link having first and second ends, said first end rotationally coupled to said lockable rotatable base with a base adjustable drag hinge;
   c. a receiver for a polygonal support adapter, said receiver rotationally coupled to said second end of said link with a receiver adjustable drag hinge, wherein said receiver comprises wire management guides protruding from an underside of said receiver; and
   d. wherein said link comprises first and second link sides, said collapsible and adjustable electrics support further comprising a first releasably snap-fit cover for said first link side of said link, wherein said first releasably snap-fit cover comprises a tool that is manually operable for adjusting at least one of said base adjustable drag hinge and said receiver adjustable drag hinge.

2. The collapsible and adjustable electronics support of claim 1, wherein said link further comprises:
   a. an icon indicating said tool on said first link side; and
   b. a second releasably snap-fit cover for said second link side of said link, wherein said second releasably snap-fit cover comprises one of:

i. a tool that is manually operable for adjusting at least one of said base and said receiver adjustable drag hinges and further comprises an icon indicating said tool; and
ii. no tool.

3. The collapsible and adjustable electronics support of claim 2, wherein:
   a. said base adjustable drag hinge has first and second ends corresponding to said first and second link sides;
   b. said receiver adjustable drag hinge has first and second ends corresponding to said first and second link sides;
   c. said first releasably snap-fit cover, when installed, extends to cover said base and receiver adjustable drag hinge first ends; and
   d. said second releasably snap-fit cover, when installed, extends to cover said base and receiver adjustable drag hinge second ends.

4. The collapsible and adjustable electronics support of claim 2, wherein said tool extends orthogonally from at least said first releasably snap-fit cover and is received, when said at least one first releasably snap-fit cover is snap-fit to said first link side, within an opening in said first link side.

5. The collapsible and adjustable electronics support of claim 2, wherein said tool comprises a hex key and said base adjustable drag hinge and said receiver adjustable drag hinge each comprise a hex socket bolt.

6. The collapsible and adjustable electronics support of claim 1, wherein said releasably lockable rotatable base further comprises:
   a. a first base element comprising a first, distally threaded, axle coupled orthogonally to a first resilient web;
   b. at least one asymmetric protrusion from said first resilient web;
   c. an adhesive second resilient web, operable to adhere to said first resilient web and to an environmental surface;
   d. a second base element having top and bottom surfaces, said second base element comprising:
      i. a first rigid web having an opening adapted to pass said axle;
      ii. a cavity on said bottom surface adapted to receive said at least one asymmetric protrusion of said first resilient web; and
      iii. a rotationally symmetric protrusion on said top surface centered on said opening;
   e. a rotatable third base element adapted to rotate freely on said axle and comprising:
      i. a support for said base adjustable drag hinge; and
      ii. a bottom surface having a rotationally symmetric cavity corresponding to said rotationally symmetric protrusion; and
   f. a manually operable nut comprising threads adapted to said axle and manually operable to one of urge said third base element against said second base element to prevent rotation of said third base element about said axle and to release said urging to allow rotation of said third base element about said axle.

7. The collapsible and adjustable electronics support of claim 6, wherein said rotatable third base element comprises a notch sized, shaped, and arranged to receive at least a portion of said wire management guides in a collapsed configuration and to receive at least a portion of a human finger tip for assisting in rotating said rotatable third base element in a deployed configuration.

8. The collapsible and adjustable electronics support of claim 1, wherein said releasably lockable rotatable base comprises a base width less than an inside web width between said first and second link sides.

9. The collapsible and adjustable electronics support of claim 1, further comprising a rigid web extending in width from said first link side to said second link side of said link, and extending in length from said base adjustable drag hinge to a length complimentary to said receiver when said receiver is in a collapsed configuration.

10. The collapsible and adjustable electronics support of claim 1, further comprising said support adapter operable to be attached to a device to be supported, wherein said receiver is sized, shaped, and arranged to slidingly, latchingly, releasably, and not rotationally receive said support adapter.

11. The collapsible and adjustable electronics support of claim 1, wherein said device to be supported comprises one of an electronic device, a holder for an electronic device, and a non-electronic device.

12. A collapsible and adjustable electronics support, comprising:
   a. a releasably lockable rotatable base;
   b. a link having first and second ends, said first end rotationally coupled to said lockable rotatable base with a base adjustable drag hinge, wherein said link comprises first and second link sides;
   c. a polygonal receiver rotationally coupled to said second end of said link with a receiver adjustable drag hinge, wherein said polygonal receiver comprises wire management guides, and
   d. first and second releasably snap-fit covers for said respective first and second sides of said link, wherein at least one of said first and second releasably snap-fit cover comprises a tool that is manually operable for adjusting said adjustable drag hinges and further comprises an icon indicating said tool.

13. The collapsible and adjustable electronics support of claim 12, wherein said releasably lockable rotatable base further comprises:
   a. a first base element comprising:
      i. a first, distally threaded, axle coupled orthogonally to a first resilient web; and
      ii. a deformable, perforated metal web co-molded with a resilient material covering; and
   b. a rotatable second base element rotationally coupled to said first base element, wherein said second base element is releasable to freely rotate on said axle and securable to prevent rotation on said axle and comprises a base adjustable drag hinge.

14. The collapsible and adjustable electronics support of claim 12, further comprising a rigid web extending in width from said first link side to said second link side of said at least one link, and extending in length from said base adjustable drag hinge to a length complimentary to said receiver when said receiver is in a collapsed configuration.

15. The collapsible and adjustable electronics support of claim 12, further comprising a support adapter operable to be attached to a device to be supported, wherein said receiver is sized, shaped, and arranged to slidingly, latchingly, releasably, and not rotationally receive said support adapter.

16. The collapsible and adjustable electronics support of claim 12, wherein said device to be supported comprises one of an electronic device, a holder for an electronic device, and a non-electronic device.

17. The collapsible and adjustable electronics support of claim 12, further comprising first and second releasably snap-fit covers for said respective first and second link sides of said link, wherein at least said first releasably snap-fit cover comprises a tool that is manually operable for adjusting said adjustable drag hinges.

18. A collapsible and adjustable electronics support, comprising:
   a. a first base element comprising a first, distally threaded, axle coupled orthogonally to a first resilient web;
   b. an asymmetric protrusion from said first resilient web;
   c. an adhesive second resilient web, operable to adhere to said first resilient web and to an environmental surface;
   d. a second base element comprising a first rigid web having an opening adapted to pass said axle and a cavity adapted to receive said asymmetric protrusion;
   e. a rotatable third base element adapted to freely rotate on said axle and comprising a base adjustable drag hinge;
   f. a nut comprising threads adapted to said first axle and manually operable to one of urge said third base element against said second base element to prevent rotation of said third base element about said axle and to release said urging to allow rotation of said third base element about said axle;
   g. said base adjustable drag hinge comprising a housing, and a first and second generally parallel arms extending from opposing ends of said housing, said first and second arms adapted at distal ends for supporting a receiver adjustable drag hinge;
   h. said receiver adjustable drag hinge comprising a receiver drag hinge housing, and a receiver extending from said receiver drag hinge housing;
   i. said receiver, operable to rotate about said receiver adjustable drag hinge within collapsed and deployed limits, to slidingly, latchingly, releasably, and not rotationally receive a support adapter, and to assist in management of at least one wire;
   j. at least one cover for at least one arm of said first and second arms, said at least one cover comprising:
      i. a tool for adjusting said base adjustable drag hinge and said receiver adjustable drag hinge; and
      ii. an icon indicating said tool; and
   k. wherein said base adjustable drag hinge and said receiver adjustable drag hinge are operable to manipulate said collapsible and adjustable electronics support between a collapsed configuration and a plurality of deployed configurations.

19. The collapsible electronics support of claim 18, further comprising a rigid web supported between said first and second arms proximal said base drag hinge and distal said second base element, and extending to be operable to receive an edge of said receiver at said collapsed rotational limit of said receiver.

20. The collapsible and adjustable electronics support of claim 18, wherein said tool extends orthogonally from said cover and is received, when said cover is on said arm, within an opening in said arm.

21. The collapsible and adjustable electronics support of claim 18, wherein:
   a. said base adjustable drag hinge has first and second ends corresponding to said first and second arms;
   b. said receiver adjustable drag hinge has first and second ends corresponding to said first and second arms;
   c. a first cover of said at least one cover extends to cover said base and receiver adjustable drag hinge first ends; and
   d. a second cover of said at least one cover extends to cover said base and receiver adjustable drag hinge second ends.

* * * * *